United States Patent
Khaled et al.

(10) Patent No.: US 10,036,297 B2
(45) Date of Patent: Jul. 31, 2018

(54) NO$_x$ ESTIMATION USING LOCAL STATE-SPACE MODELS

(71) Applicant: Cummins Emission Solutions Inc., Columbus, IN (US)

(72) Inventors: Nassim Khaled, Columbus, IN (US); Priya Naik, Columbus, IN (US)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 56 days.

(21) Appl. No.: 15/217,219

(22) Filed: Jul. 22, 2016

(65) Prior Publication Data
US 2017/0022865 A1    Jan. 26, 2017

Related U.S. Application Data

(60) Provisional application No. 62/196,506, filed on Jul. 24, 2015.

(51) Int. Cl.
*F01N 3/00*      (2006.01)
*F01N 11/00*      (2006.01)
(Continued)

(52) U.S. Cl.
CPC ............ *F01N 11/00* (2013.01); *F01N 3/2066* (2013.01); *F01N 9/005* (2013.01);
(Continued)

(58) Field of Classification Search
USPC ......... 60/274, 276, 286, 295, 297, 301, 303; 701/102, 103, 106, 109, 115
See application file for complete search history.

(56) References Cited

U.S. PATENT DOCUMENTS

| 7,676,318 B2 | 3/2010 | Allain |
| 8,024,921 B2 * | 9/2011 | Walz ...................... F01N 3/208 60/276 |

(Continued)

*Primary Examiner* — Binh Q Tran
(74) *Attorney, Agent, or Firm* — Foley & Lardner LLP

(57) ABSTRACT

Implementations described herein relate to utilizing discrete transient local state space models to modify an output from a steady state NO$_x$ estimation model to provide a final estimated NO$_x$ value. An engine operating space, defined by a speed and injection quantity map, is subdivided into several discrete local state spaces and a transient model is developed for each discrete state space to output a NO$_x$ estimation correction value. The transient models may be a regression model or the transient model may be an empirical map of data values. The NO$_x$ estimation correction value modifies a steady state NO$_x$ value to calculate the final NO$_x$ estimated value. The final NO$_x$ estimated value is then output to another component, such as a controller as an input for controlling one or more components of an engine, an aftertreatment system, and/or a diagnostic system.

19 Claims, 5 Drawing Sheets

(51) Int. Cl.
  *F01N 3/20* (2006.01)
  *F01N 9/00* (2006.01)
  *F02D 41/14* (2006.01)

(52) U.S. Cl.
  CPC ...... *F02D 41/1462* (2013.01); *F01N 2570/14* (2013.01); *F01N 2900/0601* (2013.01); *F01N 2900/1402* (2013.01); *F02D 2041/1411* (2013.01); *F02D 2041/1423* (2013.01); *F02D 2041/1433* (2013.01); *Y02T 10/24* (2013.01); *Y02T 10/47* (2013.01)

(56) References Cited

U.S. PATENT DOCUMENTS

| | | | |
|---|---|---|---|
| 8,201,394 B2 * | 6/2012 | Chi | F01N 3/208 60/276 |
| 8,301,356 B2 | 10/2012 | Wang et al. | |
| 8,387,368 B2 * | 3/2013 | Parmentier | B01D 53/90 60/276 |
| 8,453,431 B2 * | 6/2013 | Wang | F02D 41/00 60/274 |
| 8,578,705 B2 * | 11/2013 | Sindano | F01N 3/208 60/295 |
| 9,228,511 B2 * | 1/2016 | Zhu | F02D 41/0072 |

* cited by examiner

$NO_x$ ESTIMATION USING LOCAL STATE-SPACE MODELS

CROSS REFERENCE TO RELATED APPLICATIONS

The present application claims the benefit of priority to U.S. Patent Application No. 62/196,506, filed Jul. 24, 2015, the contents of which are incorporated herein by reference in their entirety.

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. To reduce $NO_x$ emissions, a SCR process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia, aqueous ammonia, or urea is typically introduced into the exhaust gas flow prior to the catalyst chamber. To introduce the reductant into the exhaust gas flow for the SCR process, an SCR system may dose or otherwise introduce the reductant through a dosing module that vaporizes or sprays the reductant into an exhaust pipe of the exhaust system up-stream of the catalyst chamber. The SCR system may include one or more sensors to monitor conditions within the exhaust system.

SUMMARY

A first set of implementations described herein relate to utilizing several discrete transient local state space models to modify the output from a steady state $NO_x$ estimation model to provide a final estimated $NO_x$ value. An engine operating space, defined by a speed and injection quantity map, is subdivided into several discrete local state spaces and a transient model is developed for each discrete state space to output a $NO_x$ estimation correction value. In some implementations, the transient models may be a regression model (e.g., a linear regression model) or the transient model may be an empirical map. The $NO_x$ estimation correction value is added to or subtracted from a steady state $NO_x$ value to arrive at the final $NO_x$ estimated value. The final $NO_x$ estimated value is then output to another component, such as a controller as an input for controlling one or more components of an engine, an aftertreatment system, and/or a diagnostic system.

In some implementations, the final $NO_x$ estimated value may be used to diagnose a physical $NO_x$ sensor by having a controller compare the final estimated $NO_x$ value to an output value indicative of sensed $NO_x$ by the physical $NO_x$ sensor. If the difference between the final estimated $NO_x$ value and the output value indicative of sensed $NO_x$ by the physical $NO_x$ sensor exceeds a threshold value, then a controller may set a parameter to a value indicative of the difference exceeding the predetermined value. In some implementations, the value for the parameter may trigger a warning lamp may to be lit, such as a malfunction indicator lamp (MIL), and/or other indicators that the difference exceeding the predetermined value. In other implementations, the value for the parameter may trigger a regeneration cycle or other processes for the engine and/or aftertreatment system.

A second set of implementations relate to a method that includes accessing, by a controller, a set of one or more combustion parameters. The method includes determining, using the controller, a steady state estimated $NO_x$ value based on a steady state model and the accessed set of one or more combustion parameters and a $NO_x$ estimation correction value based on a transient model and the accessed set of one or more combustion parameters. The method also includes calculating, using the controller, a final estimated $NO_x$ value based on the determined steady state estimated $NO_x$ value and the determined $NO_x$ estimation correction value. The method further includes outputting the final estimated $NO_x$ value as a parameter value to an aftertreatment system component or an engine component.

In some implementations, the set of one or more combustion parameters include an intake manifold pressure, an intake mass air flow, an exhaust manifold pressure, or an engine-out $NO_x$ concentration. In some implementations, the method may further include accessing a state space set of parameters comprising an engine speed, an injection quantity, or a start time of injection. The method may include selecting the steady state model based on the state space set of parameters or selecting the transient model based on the state space set of parameters. In some implementations, determining the steady state estimated $NO_x$ value based on the steady state model includes selecting a predetermined value from a look-up table using the combustion parameters as index values. In some implementations, determining the $NO_x$ estimation correction value based on the transient model includes selecting a predetermined value from a look-up table using the combustion parameters as index values. In some implementations, the aftertreatment system component is a dosing module command module configured to calculate a dosing command for a dosing module of an aftertreatment system based on the parameter value for the final estimated $NO_x$ value and output the dosing command to the dosing module. In some implementations, the engine system component is a diagnostic module configured to calculate a difference between a parameter value from a physical $NO_x$ sensor and the parameter value for the final estimated $NO_x$ value, compare the difference to a threshold value, and light a malfunction indicator lamp responsive to the calculated difference exceeding the threshold value.

A third set of implementations relate to a system that includes an exhaust system including a doser and a controller. The controller is configured to access a set of one or more combustion parameters, determine a steady state estimated $NO_x$ value based on a steady state model and the accessed set of one or more combustion parameters, and determine a $NO_x$ estimation correction value based on a transient model and the accessed set of one or more combustion parameters. The controller is further configured to calculate a final estimated $NO_x$ value based on the determined steady state estimated $NO_x$ value and the determined $NO_x$ estimation correction value, calculate a dosing command based on the final estimated $NO_x$ value, and output the dosing command as a parameter value to the doser of the exhaust system.

In some implementations, the set of one or more combustion parameters include an intake manifold pressure, an intake mass air flow, an exhaust manifold pressure, or an engine-out $NO_x$ concentration. In some implementations, the controller is further configured to access a state space set of parameters comprising an engine speed, an injection quantity, or a start time of injection. The controller may be further configured to select the steady state model based on the state space set of parameters or select the transient model based on the state space set of parameters. In some implementations, determining the steady state estimated $NO_x$ value based on the steady state model includes selecting a predetermined value from a look-up table using the combustion parameters as index values. In some implementations, determining the $NO_x$ estimation correction value based on the transient model includes selecting a predetermined value from a look-up table using the combustion parameters as index values. In some implementations, the transient model is a regression model or an empirical model. In some implementations, the controller is further configured to calculate a difference between a parameter value from a physical $NO_x$ sensor and the final estimated $NO_x$ value, compare the difference to a threshold value, and light a malfunction indicator lamp responsive to the calculated difference exceeding the threshold value.

A fourth set of implementations relate to a controller including at least one circuit that is configured to access a set of one or more combustion parameters, determine a steady state estimated $NO_x$ value based on a steady state model and the accessed set of one or more combustion parameters, and determine a $NO_x$ estimation correction value based on a transient model and the accessed set of one or more combustion parameters. The controller is further configured to calculate a final estimated $NO_x$ value based on the determined steady state estimated $NO_x$ value and the determined $NO_x$ estimation correction value, calculate a difference between a parameter value from a physical $NO_x$ sensor and the final estimated $NO_x$ value, compare the difference to a threshold value, and activate a malfunction indicator lamp responsive to the calculated difference exceeding the threshold value.

In some implementations, the set of one or more combustion parameters include an intake manifold pressure, an intake mass air flow, an exhaust manifold pressure, or an engine-out $NO_x$ concentration. In some implementations, the at least one circuit is further configured to access a state space set of parameters comprising an engine speed, an injection quantity, or a start time of injection. The at least one circuit may be further configured to select the steady state model based on the state space set of parameters or select the transient model based on the state space set of parameters. In some implementations, the at least one circuit is further configured to calculate a dosing command for a doser of an aftertreatment system based on a parameter value for the final estimated $NO_x$ value and output the dosing command to the doser.

BRIEF DESCRIPTION

The details of one or more implementations are set forth in the accompanying drawings and the description below. Other features, aspects, and advantages of the disclosure will become apparent from the description, the drawings, and the claims, in which:

Figure 4:
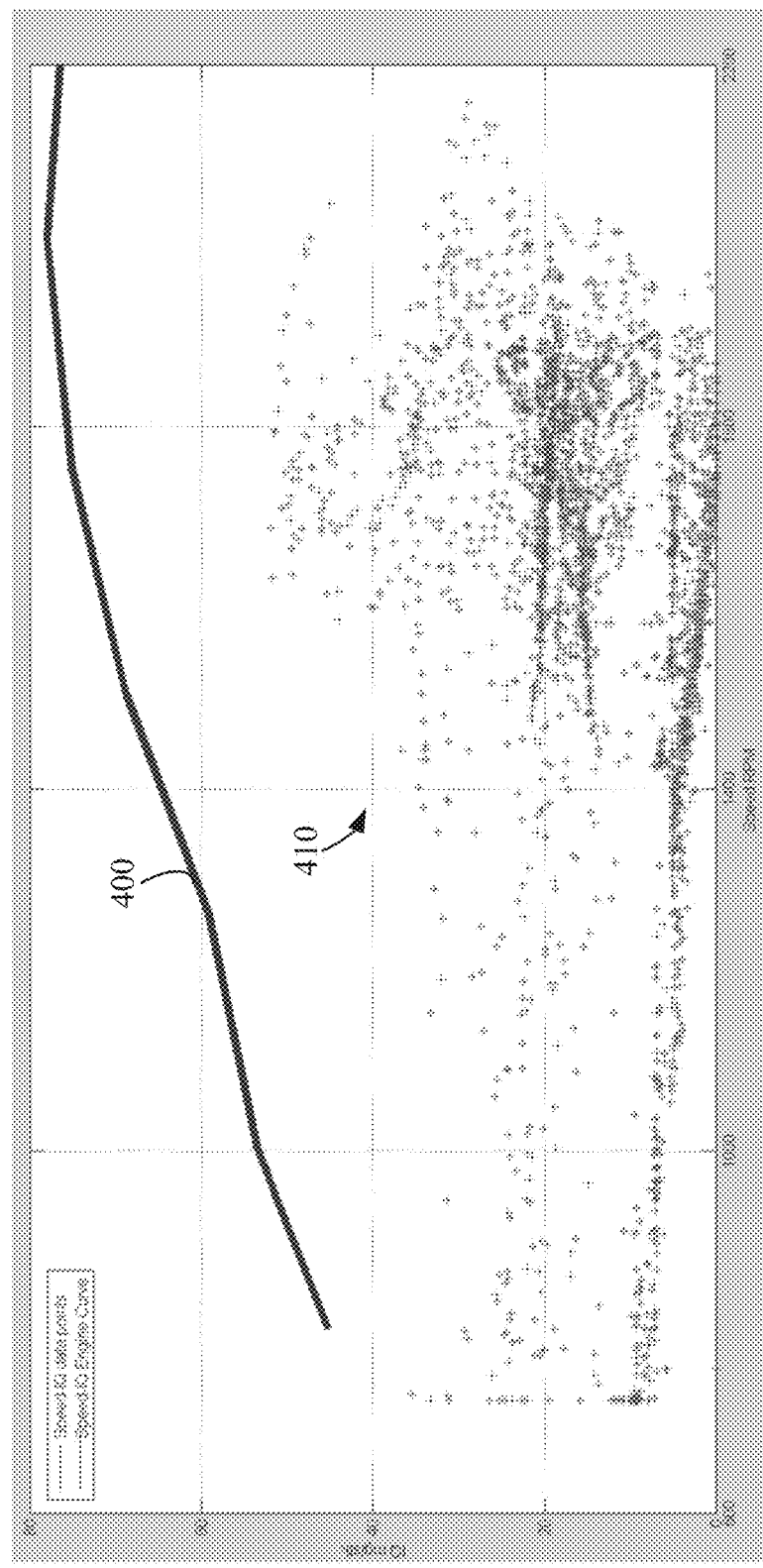
Figure 5:
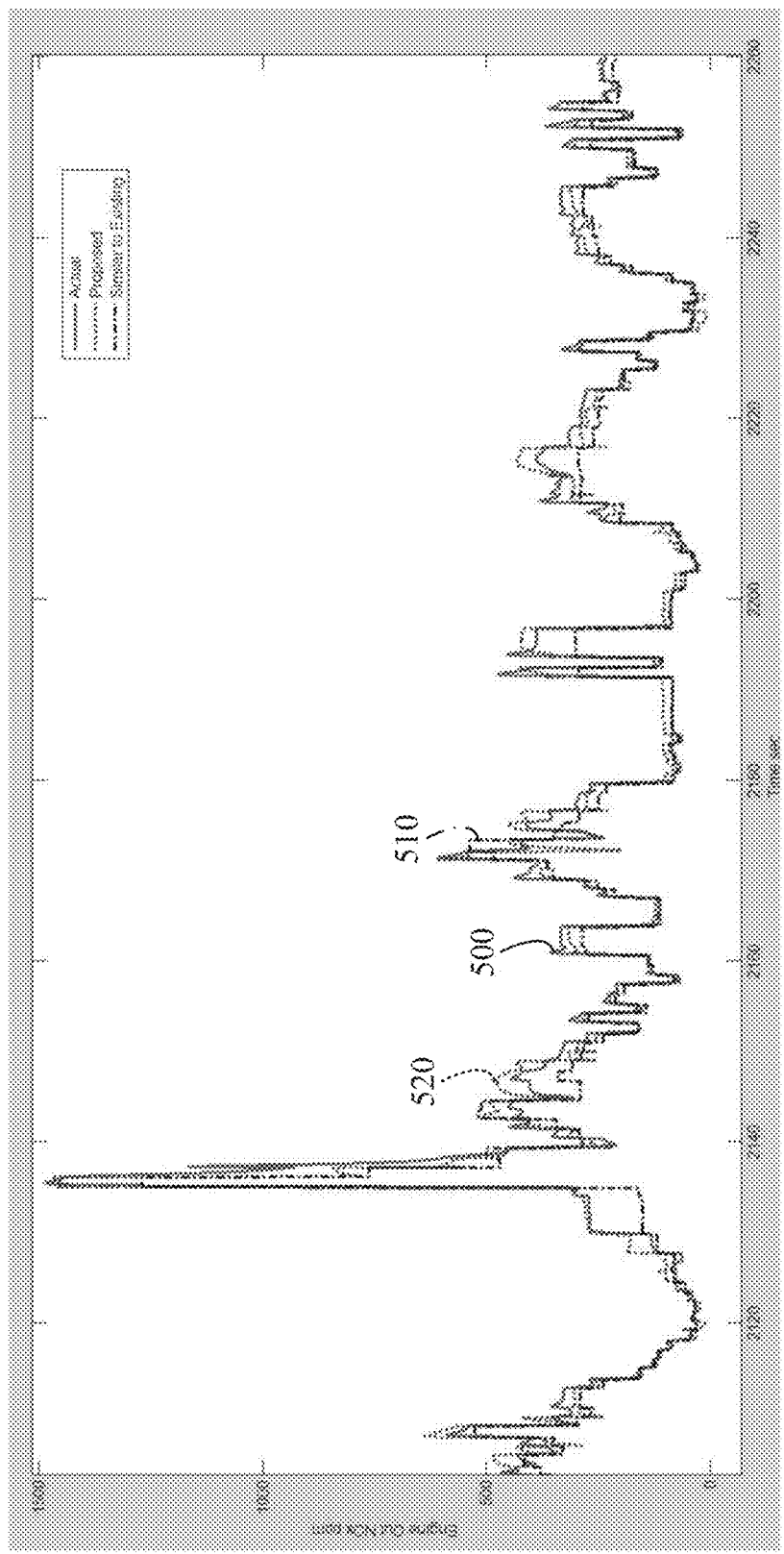

FIG. 4 is graphical diagram depicting a speed-injection quantity curve for an example engine and speed-injection quantity data points for a federal test procedure cycle; and FIG. 5 is a graphical diagram depicting an actual amount of measured $NO_x$ generated during an example cycle, an estimated amount of $NO_x$ based on a steady state model, and a final estimated amount of $NO_x$ based on the steady state model and transient model.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for utilizing several discrete transient local state space models to modify the output from a steady state $NO_x$ estimation model to provide a final estimated $NO_x$ value. The various concepts introduced above and discussed in greater detail below may be implemented in any of numerous ways, as the described concepts are not limited to any particular manner of implementation. Examples of specific implementations and applications are provided primarily for illustrative purposes.

I. Overview

The amount of $NO_x$ within an exhaust system can be measured and/or estimated using a model. The amount of $NO_x$ within the exhaust system can be used for a variety of purposes, such as to control an amount of reductant dosed by a dosing module, activate a regeneration process, detect faults with a sensor, estimate a remaining useful life for a catalyst, provide feedback for control of one or more engine components, etc. Accordingly, the more accurately the amount of $NO_x$ within the exhaust system is determined, the more accurate the resulting values for the various uses of the amount of $NO_x$ will be. That is, the greater the error in a measured or estimated amount of $NO_x$ within the exhaust system, then the error will propagate to any values resulting from using the measured or estimated amount of $NO_x$ as an input. Accordingly, increasing the accuracy of a measured or estimated amount of $NO_x$ within the exhaust system will reduce the error that is propagated to other systems and/or processes that utilize the measured or estimated amount of $NO_x$ as an input.

In some implementations, the amount of $NO_x$ within an exhaust system is estimated, such as through a feed-forward system that utilizes combustion and/or engine operating parameters to generate estimated $NO_x$ values. Such feed-forward systems may use steady state models to estimate $NO_x$ values. Such steady state models may not account for transient conditions that occur and differ from steady state conditions.

To improve the estimation of $NO_x$ values, a $NO_x$ correction value based on a discrete transient local state space model can be used to modify the output value from a steady state $NO_x$ estimation model to result in a final estimated $NO_x$ value. An engine operating space, defined by a speed and injection quantity map, is subdivided into several discrete local state spaces and a transient model is developed for each discrete state space to output a $NO_x$ estimation correction value. In some implementations, the transient models may be a regression model (e.g., a linear regression model) or the transient model may be an empirical map. The $NO_x$ estimation correction value is added to or subtracted from a steady state $NO_x$ value to arrive at the final $NO_x$ estimated value. The final $NO_x$ estimated value is then output to another component, such as a controller as an input for controlling one or more components of an engine, an aftertreatment system, and/or a diagnostic system.

In some implementations, the final $NO_x$ estimated value may be used to diagnose a physical $NO_x$ sensor by having a controller compare the final estimated $NO_x$ value to an output value indicative of sensed $NO_x$ by the physical $NO_x$ sensor. If the difference between the final estimated $NO_x$ value and the output value indicative of sensed $NO_x$ by the physical $NO_x$ sensor exceeds a threshold value, then a controller may set a parameter to a value indicative of the difference exceeding the predetermined value. In some implementations, the value for the parameter may trigger a warning lamp may to be lit, such as a malfunction indicator lamp (MIL), and/or other indicators that the difference exceeding the predetermined value. In other implementations, the value for the parameter may trigger a regeneration cycle or other processes for the engine and/or aftertreatment system.

II. Overview of Aftertreatment System

Figure 1:
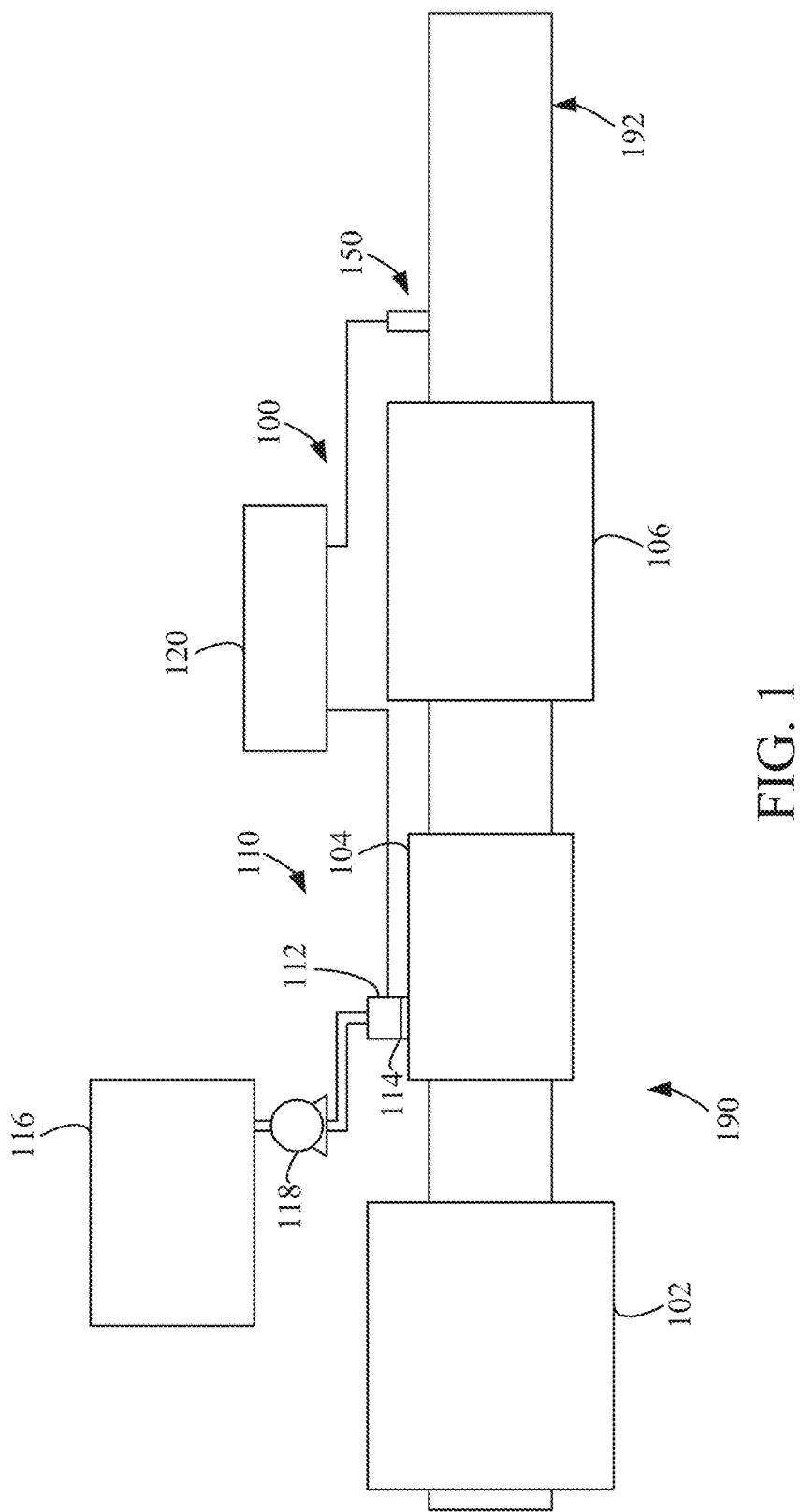
FIG. 1 is a block schematic diagram of an example selective catalytic reduction system having an example reductant delivery system for an exhaust system.

FIG. 1 depicts an aftertreatment system 100 having an example reductant delivery system 110 for an exhaust system 190. The aftertreatment system 100 includes a diesel particulate filter (DPF) 102, the reductant delivery system 110, a decomposition chamber or reactor 104, a SCR catalyst 106, and a sensor 150.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea or diesel exhaust fluid (DEF), into ammonia. The decomposition chamber 104 includes a reductant delivery system 110 having a dosing module or doser 112 configured to dose the reductant into the decomposition chamber 104. In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The decomposition chamber 104 includes the dosing module 112 mounted to the decomposition chamber 104 such that the dosing module 112 may dose the reductant into the exhaust gases flowing in the exhaust system 190. The dosing module 112 may include an insulator 114 interposed between a portion of the dosing module 112 and the portion of the decomposition chamber 104 to which the dosing module 112 is mounted. The dosing module 112 is fluidly coupled to one or more reductant sources 116. In some implementations, a pump 118 may be used to pressurize the reductant from the reductant source 116 for delivery to the dosing module 112.

The dosing module 112 and pump 118 are also electrically or communicatively coupled to a controller 120. The controller 120 is configured to control the dosing module 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

Figure 3:
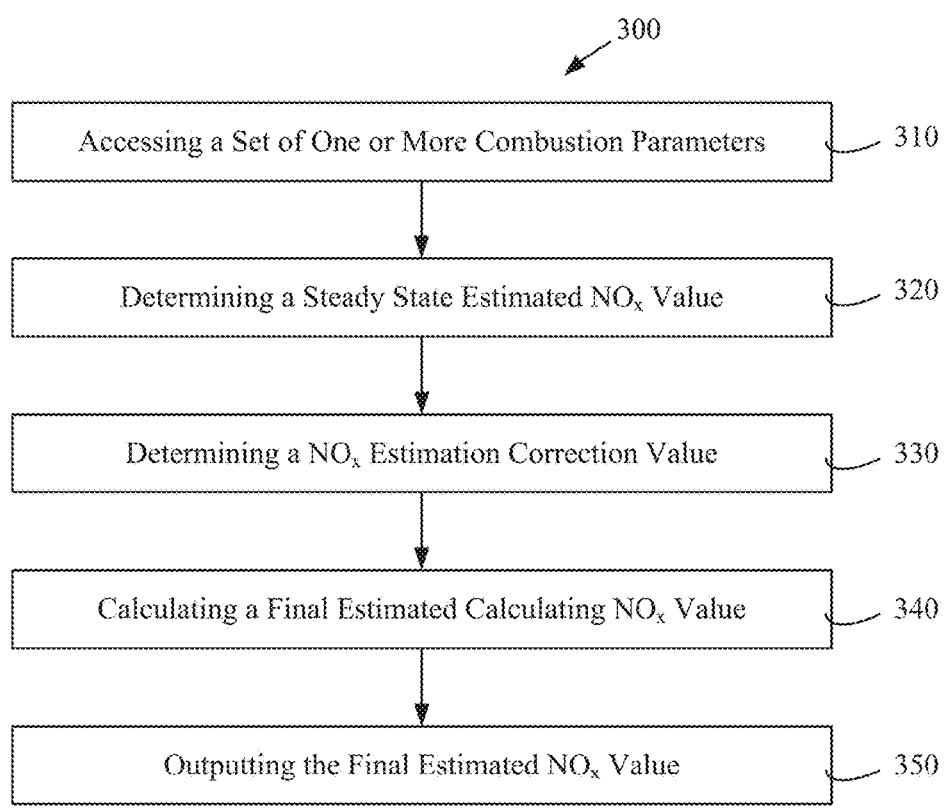
FIG. 3 is a flow diagram depicting a process for calculating a final estimated $NO_x$ value and outputting the final estimated $NO_x$ value.

In certain implementations, the controller 120 is structured to perform certain operations, such as those described herein in relation to FIG. 3. In certain implementations, the controller 120 forms a portion of a processing subsystem including one or more computing devices having memory, processing, and communication hardware. The controller 120 may be a single device or a distributed device, and the functions of the controller 120 may be performed by hardware and/or as computer instructions on a non-transient computer readable storage medium.

In certain implementations, the controller 120 includes one or more modules structured to execute the operations of the controller 120. In certain implementations, the controller 120 may include a $NO_x$ value correction module or circuit structured to perform the operations described in reference to FIG. 3. The $NO_x$ value correction module is structure to access a set of one or more combustion parameters, determine a steady state estimated $NO_x$ value, determine a $NO_x$ estimation correction value, calculate a final estimated $NO_x$ value, and output the final estimated $NO_x$ value to another component of the aftertreatment system 100. In one implementation, the $NO_x$ value correction module may include a processor, an input/output device, a memory or other storage device, etc. In another implementation, the $NO_x$ value correction module may include communication circuitry (e.g., relays, communication buses, etc.) that communicably couples the $NO_x$ value correction module with one or more sensors of the aftertreatment system 100, one or more sensors of an engine, a memory or storage device, a malfunction indicator lamp, an in-cab display, a heads-up display, a diagnostic port, etc. In still further implementations, the $NO_x$ value correction module may be structured as machine-readable content executable by a processor of the controller 120. In yet another implementation, the $NO_x$ value correction module may include a combination of communication circuitry, one or more pieces of hardware, such as one or more sensors of the aftertreatment system 100, one or more sensors of an engine, a memory or storage device, a malfunction indicator lamp, an in-cab display, a heads-up display, a diagnostic port, etc., and/or machine-readable content executable by the processor of the controller 120.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes inlet in fluid communication with the decomposition chamber 104 from which exhaust gas and reductant is received and an outlet in fluid communication with an end of the exhaust system 190.

The exhaust system 190 may further include a diesel oxidation catalyst (DOC) in fluid communication with the exhaust system 190 (e.g., downstream of the SCR catalyst 106 or upstream of the DPF 102) to oxidize hydrocarbons and carbon monoxide in the exhaust gas.

In some implementations, the DPF 102 may be positioned downstream of the decomposition chamber or reactor pipe 104. For instance, the DPF 102 and the SCR catalyst 106 may be combined into a single unit. In some implementations, the dosing module 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190, such as a tip of the sensor 150 may extend into a portion of the exhaust system 190. In other implementations, the sensor 150 may receive exhaust gas through another conduit, such as a sample pipe extending from the exhaust system 190. While the sensor 150 is depicted as positioned downstream of the SCR catalyst 106, it should be understood that the sensor 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensor 150 may be utilized for detecting a condition of the exhaust gas, such as two, three, four, five, or size sensor 150 with each sensor 150 located at one of the foregoing positions of the exhaust system 190.

III. Example System for Improving $NO_x$ Estimation Using Local Transient Models To comply with some emissions requirements, combustion engines are combined with an aftertreatment system, such as aftertreatment system 100 of FIG. 1. For diesel engines that produce $NO_x$, the aftertreatment system is configured to reduce the concentrations of $NO_x$ emitted from the system. Aspects of the aftertreatment system may rely on a measured or estimated amount of $NO_x$ in the system to reduce the concentrations of $NO_x$, such as to regulate an amount of dosed reductant, activate a regeneration process, detect faults with a $NO_x$ sensor, estimate a remaining useful life for a SCR catalyst, provide feedback for control of one or more engine components, etc. A controller, such as controller 120, for the aftertreatment system receive a parameter indicative of a measured amount of $NO_x$ flowing through the exhaust system, such as via a $NO_x$ sensor, or may estimate an amount of $NO_x$ flowing through the system, such as using feed-forward models, etc. In the case where $NO_x$ flowing through the system is being estimated, such estimations may utilize models that rely and/or are based upon steady state conditions. That is, data from an engine operating at a select operating condition is taken once the output values are stabilized and the steady state model is generated based on that data, such as via a regression model. However, an engine operating in real-world conditions may progress rapidly through various operating conditions, resulting in the output data values from such steady state models differing from the actual values intended to be estimated from the steady state models. Such transient variation through changing operating conditions and the differing estimated output data values may result in an offset or inaccurate estimated value relative to a true or measured value. Accordingly, an estimation correction value to modify the steady state estimated value may improve the accuracy of a final calculated estimated value by accounting for the transient variation.

Figure 2:
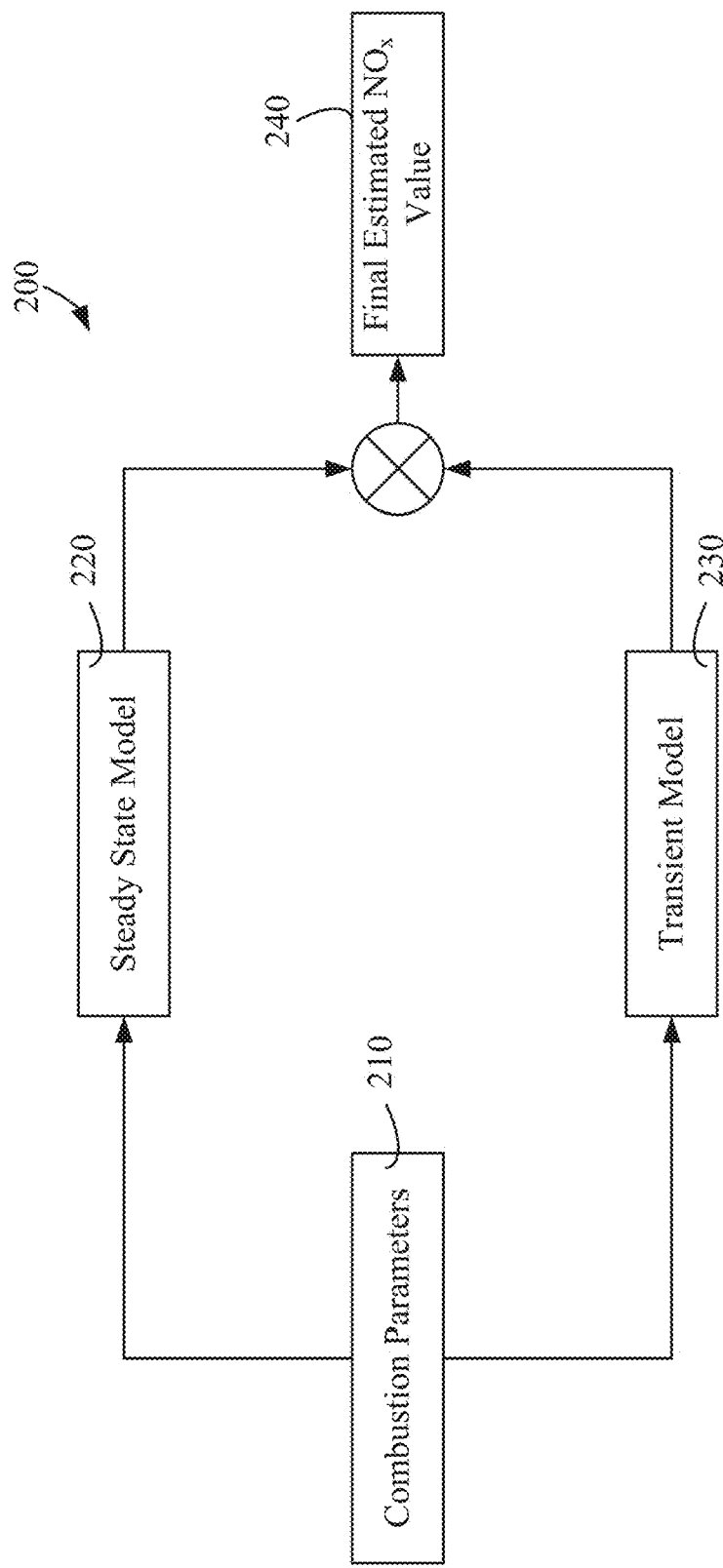
FIG. 2 is a block diagram depicting inputs to a steady state model and transient model and combining the outputs of the steady state model and transient model for a final estimated $NO_x$ value.

FIG. 2 depicts an overview for the calculation of a final estimated value 240 of an output, such as $NO_x$ concentration, based on a steady state model 220 and a estimation correction value from a transient model 230. FIG. 2 depicts a block diagram 200 of inputs 210 to the steady state model 220 and transient model 230 and combining the outputs of the steady state model 220 and transient model 230 for the final estimated $NO_x$ value 240.

The inputs 210 may be combustion parameters in the form of a state vector and may include elements such as an intake manifold pressure, an intake mass air flow, an exhaust manifold pressure, and/or an engine-out $NO_x$ concentration. In some implementations, a state space vector and/or elements may be included as part of the inputs 210. For instance, a state space vector and/or elements may include an engine speed, an injection quantity, and/or a start time of injection. The combustion parameters are used as input values for variables for model equations of the steady state model 220 and/or transient model 230. The state space vector and/or elements may be used to select a corresponding steady state model 220 and/or transient model 230.

In some implementations, several transient models 230 may be stored in a data storage, such as a memory of a controller, and retrieved based on the state space vector and/or elements. Each of the several transient models 230 may be pre-generated for a corresponding engine operating space based on a speed-injection quantity map that is divided into multiple regions called modes. A local transient model 230 is developed for each of these modes and indexed based on the state space vector parameter values and/or elements. The number of modes (i.e., the number of divisions of to the engine operating space) can be a predetermined number selected by a user, selected and/or maximized based on a memory amount allocation, selected and/or maximized based on a minimum accuracy and/or error for the final estimated value, etc. Each local transient model is a state space model that provides a $NO_x$ estimation correction value to a corresponding estimated steady state $NO_x$ value. In some implementations, the local transient model 230 can be based on a regression model. In other implementations, the local transient model 230 can be based on an empirical map of prior data values.

Each local transient model 230 may be based on a model where:

$$x'=Ax+Bu$$

$$y=Cx+Du$$

where u is the input vector (e.g., having elements of engine speed, injection quantity, start of injection values, etc.) of differences from the respective steady state values, x is the estimated engine state vector (e.g., having elements of intake manifold pressure, intake mass air flow, exhaust manifold pressure, and engine out $NO_x$ values) of differences from the respective steady state values, and y is the $NO_x$ estimation correction value. A, B, C, and D are matrix parameters that characterize the specific local transient model 230 and may be obtained by state identification using experimental data.

The combustion parameters are input into the steady state model 220 to result in an estimated steady state $NO_x$ value. The combustion parameters are also input into the transient model 230 to result in a $NO_x$ estimation correction value. In some implementations, the $NO_x$ estimation correction value is added and/or subtracted from the estimated steady state $NO_x$ value to result in a final estimated $NO_x$ value 240. In other implementations, the $NO_x$ estimation correction value may be multiplied as a scaling factor for the estimated steady state $NO_x$ value to result in the final estimated $NO_x$ value 240. Still other calculations using the $NO_x$ estimation correction value and the estimated steady state $NO_x$ value to result in the final estimated $NO_x$ value 240 may be implemented.

Once the final estimated $NO_x$ value 240 is calculated, the final estimated $NO_x$ value 240 may be stored as a value for a parameter, output as a parameter value to another component of the aftertreatment system and/or engine system, compared to a threshold value to trigger an event, such as lighting a MIL, etc.

FIG. 3 depicts an example process 300 that may be performed by the $NO_x$ value correction module for utilizing a discrete transient local state space model to modify an output from a steady state $NO_x$ estimation model to provide a final estimated $NO_x$ value. The process 300 includes accessing a set of one or more combustion parameters (block 310). The set of one or more combustion parameters may include an intake manifold pressure, an intake mass air flow, an exhaust manifold pressure, and/or an engine-out $NO_x$ concentration. In some implementations, the set of one or more combustion parameters may be a vector of values with each element corresponding to the parameters of an intake manifold pressure, an intake mass air flow, an exhaust manifold pressure, and/or an engine-out $NO_x$ concentration. In some implementations, the $NO_x$ value correction module may access the set of one or more combustion parameters from one or more sensors of the aftertreatment system and/or engine, from a memory or storage device, etc.

The process 300 includes determining a steady state estimated $NO_x$ value (block 320). The steady state estimated $NO_x$ value is determined using a steady state model, such as steady state model 220. The steady state model may be one of several steady state models and may be selected based on a state space vector and/or elements. The state space vector and/or elements may include an engine speed, an injection quantity, and/or a start time of injection. In some implementations, the combustion parameters are used as input values for variables for a model equation of the steady state model to determine the steady state estimated $NO_x$ value. In other implementations, the combustion parameters may be used as index values to look up a predetermined value from a look-up table for the steady state estimated $NO_x$ value. In some implementations, the $NO_x$ value correction module may determine a steady state estimated $NO_x$ value using a processor of the controller and accessing one or more steady state models from a memory and/or storage device. The processor may utilize the accessed set of one or more combustion parameters with a steady state model retrieved from the memory and/or storage device to calculate the steady state estimated $NO_x$ value.

The process 300 includes determining a $NO_x$ estimation correction value (block 330). The $NO_x$ estimation correction value is determined using a transient model, such as transient model 230. The transient model may be one of several transient local state space models and may be selected based on a state space vector and/or elements. The state space vector and/or elements may include an engine speed, an injection quantity, and/or a start time of injection. In some implementations, the combustion parameters are used as input values for variables for a model equation of the transient model to determine the $NO_x$ estimation correction value. In other implementations, the combustion parameters may be used as index values to look up a predetermined value from a look-up table for the $NO_x$ estimation correction value. In some implementations, the $NO_x$ value correction module may determine a $NO_x$ estimation correction value using a processor of the controller and accessing one or more transient models from a memory and/or storage device. The processor may utilize the accessed set of one or more combustion parameters with a transient model retrieved from the memory and/or storage device to calculate the $NO_x$ estimation correction value.

The process 300 also includes calculating a final estimated $NO_x$ value (block 340). In some implementations, the $NO_x$ estimation correction value is added and/or subtracted from the estimated steady state $NO_x$ value to result in the final estimated $NO_x$ value. In other implementations, the $NO_x$ estimation correction value may be multiplied as a scaling factor for the estimated steady state $NO_x$ value to result in the final estimated $NO_x$ value. Still other calculations using the $NO_x$ estimation correction value and the estimated steady state $NO_x$ value to result in the final estimated $NO_x$ value may be implemented. In some implementations, the $NO_x$ value correction module may calculate a final estimated $NO_x$ value using a processor of the controller based on the values of the steady state estimated $NO_x$ value and the $NO_x$ estimation correction value that are stored in a memory or other storage device.

The process 300 further includes outputting the final estimated $NO_x$ value (block 350). In some implementations, the final estimated $NO_x$ value may be stored as a value for a parameter, output as a parameter value to another component of the aftertreatment system and/or engine system, compared to a threshold value to trigger an event, such as lighting a MIL, etc. For instance, the final estimated $NO_x$ value may be output as a parameter value to a dosing module control unit as an input for determining a dosing command value to be output to a dosing module. In some instances, the final estimated $NO_x$ value may be output as a parameter value to a diagnostic system as an input for determining whether a physical $NO_x$ sensor is malfunctioning. The diagnostic system may receive a parameter value as an output from the physical $NO_x$ sensor indicative of a measured concentration of $NO_x$ in the exhaust system and the final estimated $NO_x$ value. The diagnostic system calculates a difference between the parameter value from the physical $NO_x$ sensor and the final estimated $NO_x$ value and compares the difference to a threshold value. If the calculated difference exceeds the threshold value, then an event may be triggered, such as setting an error parameter value, lighting a MIL, etc. In some implementations, the $NO_x$ value correction module output the final estimated $NO_x$ value using an input/output device to another component of the aftertreatment system. For instance, the input/output device may be in communication with a memory or storage device, a malfunction indicator lamp, an in-cab display, a heads-up display, a diagnostic port, etc.

FIG. 4 depicts a speed-injection quantity curve 400 for an example simulated non-linear engine model and speed-injection quantity data points 410 for an example cycle. The speed-injection quantity curve 400 is generated for a 2.8 L engine without exhaust gas recirculation and depicts an injection quantity (in mg/stk), ranging from approximately 45 mg/stk to 77 mg/stk, for a range of engine speeds (in RPM), ranging from 800 RPM to 2200 RPM. The speed-injection quantity data points 410 correspond to discrete injection quantities at corresponding engine speeds and corresponding times for the example cycle.

FIG. 5 depicts an actual amount of measured engine-out $NO_x$ (in ppm) generated during an example cycle 500 over a period of time (in seconds) for the speed-injection quantity curve 400 of FIG. 4 and speed-injection quantity data points 410 for the example cycle. The graph also includes the estimated amount of $NO_x$ based on the steady state model alone 510 (shown as the dashed and dotted line), and the final estimated amount of $NO_x$ based on the steady state model and incorporating the $NO_x$ estimation correction values from the transient models 520 (shown as the dotted line). The steady state model data 510 is based on a look-up table of values. As shown, the final estimated amount of $NO_x$ based on the steady state model and incorporating the $NO_x$ estimation correction values from the transient models 520 results in a closer fit to the actual amount of measured engine-out $NO_x$ than the estimated amount of $NO_x$ based on the steady state model alone 510. For the example shown, the final estimated amount of $NO_x$ based on the steady state model and incorporating the $NO_x$ estimation correction values from the transient models 520 results in a reduction of 22% for the standard deviation from the actual amount of measured engine-out $NO_x$ relative to the standard deviation of the estimated amount of $NO_x$ based on the steady state model alone 510 from the actual amount of measured engine-out $NO_x$. In addition, the final estimated amount of $NO_x$ based on the steady state model and incorporating the $NO_x$ estimation correction values from the transient models 520 results in a reduction of 32.5% for the RMSE value from the actual amount of measured engine-out $NO_x$ relative to the standard deviation of the estimated amount of $NO_x$ based on the steady state model alone 510 from the actual amount of measured engine-out $NO_x$.

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code).

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the implementations described above should not be understood as requiring such separation in all implementations, and it should be understood that the described components and systems can generally be integrated in a single product or packaged into multiple products embodied on tangible media.

As utilized herein, the terms "approximately," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow.

What is claimed is:

1. A method comprising:
   accessing, by a controller, a set of one or more combustion parameters;
   accessing a state space set of parameters comprising an engine speed, an injection quantity, or a start time of injection;
   determining, using the controller, a steady state estimated $NO_x$ value based on a steady state model and the accessed set of one or more combustion parameters;
   selecting a transient model from a plurality of stored transient models based on the state space set of parameters;
   determining, using the controller, a $NO_x$ estimation correction value based on the selected transient model and the accessed set of one or more combustion parameters;
   calculating, using the controller, a final estimated $NO_x$ value based on the determined steady state estimated $NO_x$ value and the determined $NO_x$ estimation correction value; and
   outputting the final estimated $NO_x$ value as a parameter value to an aftertreatment system component or an engine component.

2. The method of claim 1, wherein the set of one or more combustion parameters comprises an intake manifold pressure, an intake mass air flow, an exhaust manifold pressure, or an engine-out $NO_x$ concentration.

3. The method of claim 1 further comprising:
   selecting the steady state model based on the state space set of parameters.

4. The method of claim 1, wherein determining the steady state estimated $NO_x$ value based on the steady state model comprises selecting a predetermined value from a look-up table using the combustion parameters as index values.

5. The method of claim 1, wherein determining the NOx estimation correction value based on the transient model comprises selecting a predetermined value from a look-up table using the combustion parameters as index values.

6. The method of claim 1, wherein the aftertreatment system component is a dosing module command module configured to calculate a dosing command for a dosing module of an aftertreatment system based on the parameter value for the final estimated NOx value and output the dosing command to the dosing module.

7. The method of claim 1, wherein the engine system component is a diagnostic module configured to calculate a difference between a parameter value from a physical NOx sensor and the parameter value for the final estimated NOx value, compare the difference to a threshold value, and light a malfunction indicator lamp responsive to the calculated difference exceeding the threshold value.

8. A system comprising:
   an exhaust system including a closer; and
   a controller configured to:
   access a set of one or more combustion parameters;
   access a state space set of parameters comprising an engine speed, an injection quantity, or a start time of injection;
   determine a steady state estimated $NO_x$ value based on a steady state model and the accessed set of one or more combustion parameters;
   select a transient model from a plurality of stored transient models based on the state space set of parameters;
   determine a $NO_x$ estimation correction value based on the transient model and the accessed set of one or more combustion parameters;
   calculate a final estimated $NO_x$ value based on the determined steady state estimated $NO_x$ value and the determined $NO_x$ estimation correction value;
   calculate a dosing command based on the final estimated $NO_x$ value; and
   output the dosing command as a parameter value to the doser of the exhaust system.

9. The system of claim 8, wherein the set of one or more combustion parameters comprises an intake manifold pressure, an intake mass air flow, an exhaust manifold pressure, or an engine-out NOx concentration.

10. The system of claim 8, wherein the controller is further configured to select the steady state model based on the state space set of parameters.

11. The system of claim 8, wherein determining the steady state estimated NOx value based on the steady state model comprises selecting a predetermined value from a look-up table using the combustion parameters as index values.

12. The system of claim 8, wherein determining the NOx estimation correction value based on the transient model comprises selecting a predetermined value from a look-up table using the combustion parameters as index values.

13. The system of claim 8, wherein the transient model is a regression model.

14. The system of claim 8, wherein the transient model is an empirical model.

15. The system of claim 8, wherein the controller is further configured to calculate a difference between a parameter value from a physical NOx sensor and the final estimated NOx value, compare the difference to a threshold value, and light a malfunction indicator lamp responsive to the calculated difference exceeding the threshold value.

16. A controller comprising at least one circuit configured to:
   access a set of one or more combustion parameters;
   access a state space set of parameters comprising an engine speed, an injection quantity, or a start time of injection;
   determine a steady state estimated $NO_x$ value based on a steady state model and the accessed set of one or more combustion parameters;
   select a transient model from a plurality of stored transient models based on the state space set of parameters;
   determine a $NO_x$ estimation correction value based on a transient model and the accessed set of one or more combustion parameters; and
   calculate a final estimated $NO_x$ value based on the determined steady state estimated $NO_x$ value and the determined $NO_x$ estimation correction value;
   calculate a difference between a parameter value from a physical $NO_x$ sensor and the final estimated $NO_x$ value;
   compare the difference to a threshold value; and
   activate a malfunction indicator lamp responsive to the calculated difference exceeding the threshold value.

17. The controller of claim 16, wherein the set of one or more combustion parameters comprises an intake manifold pressure, an intake mass air flow, an exhaust manifold pressure, or an engine-out NOx concentration.

18. The controller of claim 16, wherein the at least one circuit is further configured to select the steady state model based on the state space set of parameters.

19. The controller of claim 16, wherein the at least one circuit is further configured to calculate a dosing command for a doser of an aftertreatment system based on a parameter value for the final estimated NOx value and output the dosing command to the doser.

\* \* \* \* \*